United States Patent Office 3,781,392
Patented Dec. 25, 1973

3,781,392
PRODUCTION OF SINTERED POROUS METAL FLUORIDE PELLETS
Lowell W. Anderson and Michael J. Stephenson, Oak Ridge, Tenn., assignors to the United States of America as represented by the United States Atomic Energy Commission
No Drawing. Filed Oct. 7, 1971, Ser. No. 187,573
Int. Cl. B01j 1/22; C01f 7/50; C04b 35/64
U.S. Cl. 264—65                                              7 Claims

ABSTRACT OF THE DISCLOSURE

Porous pellets characterized by a moderately reactive crust and a softer core of higher reactivity are produced by forming agglomerates containing a metal fluoride powder and a selected amount of water. The metal fluoride is selected to be sinterable and essentially non-reactive with gaseous fluorinating agents. The agglomerates are contacted with a gaseous fluorinating agent under controlled conditions whereby the heat generated by localized reaction of the agent and water is limited to values effecting bonding by localized sintering.

BACKGROUND OF THE INVENTION

This invention was made in the course of, or under, a contract with the United States Atomic Energy Commission.

This invention relates generally to porous pellets and the fabrication thereof, and more particularly to porous pellets having a two-layer structure.

As described in our co-pending, co-assigned U.S. Pat. application Ser. No. 849,200, filed on Aug. 11, 1969, now U.S. Pat. 3,625,661, various metal fluorides are useful as sorption agents for certain gaseous fluorides. For example, porous pellets composed of cryolite ($Na_3AlF_6$) can be used to selectively remove trace quantities of niobium pentafluoride from a feed gas consisting predominantly of uranium hexafluoride. The feed gas is passed through a bed of the pellets maintained at a temperature promoting sorption of the pentafluoride. Subsequently, the bed temperature is shifted to a value effecting desorption of the pentafluoride and thus regeneration of the pellets. Usually, the same pellet bed is used for a series of such sorption-desorption cycles. It is highly desirable, therefore, that the sorption pellets not only be suitably reactive and suitably porous but that they be hard enough to withstand transport and repeated use without fracturing or powdering appreciably.

In sorption operations of the type described above, the feed gas diffuses into the pellets through the pellet voids. At some point, the fluoride impurity (e.g., niobium pentafluoride) preferentially reacts with the surfaces (internal or external) of the pellet, forming a product which restricts gas transport in that region. If the pellet is highly reactive (has a high surface area per unit volume), the voids in the exterior layer of the pellet rapidly begin to plug with the reaction product, significantly reducing the sorption capacity of the pellet as a whole. If the pellet is not highly reactive, however, its rate of reaction with the impurity may not be sufficient to accommodate rapid changes in the impurity content of the feed gas. Satisfying these conflicting requirements has been a continuing problem in the production of pellets for sorption applications. The problem is made more difficult by the additional requirement that the pellets have a high initial void fraction, the sorption capacity of the pellet being directly related to void fraction.

To summarize, it is highly desirable that sorption pellets (a) be sufficiently hard to withstand handling and repeated use, (b) have a surface area per unit volume consistent with a high sorption capacity and a high rate of reaction, and (c) have a high initial void fraction. The conventional methods for fabricating porous pellets have not met these criteria entirely satisfactorily. For example, sorption pellets have been fabricated by mixing, say, powdered NaF with water to form an agglomerate, drying the agglomerate, and sintering the agglomerate in air at a temperature in the range of from 1200 to 1700° F. The resulting completely or generally sintered pellets are characterized by a suitable hardness but also by an undesirably low void fraction and surface area. Another conventional technique comprises the steps of drying the wet agglomerate, sintering the agglomerate in argon or nitrogen at about 1000° F. or higher (depending on the particular material), and then contacting the agglomerate with undiluted fluorine at 250° F. to remove trace quantities of any organic matter present, such as a lubricant used in the formation of the pellets. Again, the product is a completely or generally sintered porous pellet having satisfactory hardness but also an undesirably low surface area and void fraction.

SUMMARY OF THE INVENTION

It is, therefore, an object of this invention to provide a novel method for the production of porous pellets.

It is another object to provide a method for the production of porous metal fluoride pellets characterized by comparatively high initial void fraction, internal reactivity, and external hardness.

It is still another object to provide porous metal fluoride pellets having a structure rendering them especially suitable for sorption applications.

In accordance with our invention a wet agglomerate is prepared from a mixture of water and a sinterable metal fluoride powder essentially non-reactive with gaseous fluorinating agents. The water content of the agglomerate is reduced to a value in the range of about 0.5 to 25 wt. percent. If it is not already in this range. The resulting agglomerate is contacted with a gaseous fluorinating agent to convert essentially all of the water therein to volatile products by means of the exothermic reaction of water and the fluorinating agent. The concentration of the fluorinating agent and the temperature at which the agglomerate is contacted are controlled to limit the heat generated by fluorination essentially to values effecting bonding of the agglomerate by localized sintering. The resulting product is a porous pellet consisting of a moderately reactive crust and an interior which, compared to the crust, has a lower degree of hardness and a higher reactivity.

DESCRIPTION OF THE PREFERRED EMBODIMENT

Our invention is not limited to porous pellets useful for the sorption of gaseous impurities, but for brevity it will be illustrated herein in terms of that application.

We have found that the deficiencies of the conventional sorption pellets referred to above are due largely to the fact that they are completely or generally sintered. We have developed a process whereby pellets having more suitable sorption properties are produced by what is referred to herein as localized sintering. Such sintering is effected by heat generated by localized chemical reactions within a sinterable body.

In practicing our invention, a wet agglomerate is prepared by mixing water and a sinterable metal fluoride powder essentially nonreactive with gaseous fluorinating agents. Our method can be conducted with any such metal fluoride, but where sorption pellets are desired the starting powder will, of course, be selected to have good sorption properties for whatever impurity is of interest. The following is a partial, exemplary listing of metal fluorides which meet the above-mentioned criteria and in addition are known to be useful as sorbents: NaF, KF, $LiF_2$, $CaF_2$, $MgF_2$, $SrF_2$, $BaF_2$, $AlF_3$, $CuF_2$, $NiF_2$, $BiF_3$, $Na_3AlF_6$, $MgSiF_6$, $Na_2ZrF_6$, and $K_2ZrF_6$.

The average particle size of the powder is not highly critical. In general, powders with mesh sizes in the range of about 100 to 300 provide porous pellets with lower surface areas and lower void fractions than do larger-size powders. In the preparation of the agglomerates, the amount of water mixed with the metal fluoride powder can be varied over wide limits. The resulting wet mix may be formed into agglomerates by utilizing a conventional apparatus, such as a mechanical pelletizer or a conventional extruder. Although extrusion of the powder-and-water mix can be accomplished successfully without a special lubricant if special care is taken and if highly polished dies are employed, the operation usually is simplified if a volatilizable organic lubricant is incorporated in the mix. The organic lubricant may, for example, be one of a variety of stearates—e.g., stearic acid, stearyl alcohol, zinc stearate—any of which is volatilized—e.g., fluorinated to volatile products—in a subsequent step of our process. The proportion of lubricant in the mix is not highly critical; the most suitable concentration can be readily determined by experiment and typically varies from about 0.50 to 1.5 wt. percent.

The water content of the agglomerates is reduced to a value in the range of about 0.5–25 wt. percent if it is not already in this range. The phrase "forming an agglomerate containing about 0.5 to 25 wt. percent water" is used herein to include reduction of the water content to this range, if necessary. Preferably, the water content is reduced to a value of 2–10 wt. percent. The process parameters in subsequent steps of the process can be adjusted to accommodate water contents in the range of 10–25 wt. percent, but longer processing times are required. If removal of water from the agglomerate is required to achieve the desired range, this can be accomplished in various ways, as by heating moderately or exposing the agglomerates to atmospheric air for several hours. An agglomerate containing water in the range of 0.5 to 25 wt. percent can withstand careful handling and can be processed satisfactorily in the remaining steps of our process.

The agglomerates containing 0.5 to 25 wt. percent water are prepared for exposure to high concentrations of a gaseous fluorinating agent by contacting them, while at a moderate temperature, with a gas mixture comprising a non-reactive gas containing a comparatively low concentration of the agent. The conditions for conducting this operation with a given agglomerate can be determined readily by routine experimentation. As conducted with fluorine, this operation can comprise maintaining the agglomerates at a temperature in the range of about 80 to 100° F. while contacting them with a non-reactive gas containing from about 0.5 to 10 vol. percent fluorine, and then gradually increasing the temperature to a selected value below the generalized-sintering temperature of the agglomerates. The generalized-sintering temperature varies, of course, with various type of agglomerates but can be determined readily by experimentation. Following this operation, the temperature is maintained at or near the above-mentioned selected value while the fluorine concentration is gradually increased to a final value ·in the range of about 80 to 100 vol. percent. The fluorine is maintained at this final value until consumption of the fluorine has essentially ceased. As indicated above, the resulting product is a porous metal fluoride pellet having a comparatively hard, moderately reactive exterior and a more-reactive (higher-surface-area) interior characterized by a higher sorption capacity.

The drying and relatively low-temperature fluorination steps just described are conducted at temperatures below the range of temperatures effecting generalized sintering of the agglomerate. Put another way, these steps are conducted at temperatures below the "normal" sintering temperature of the agglomerate in the same atmosphere. In the course of these steps, *localized* sintering does occur at points in the agglomerate where fluorine contacts water or lubricant and a sufficiently high temperature is generated by the resulting localized fluorination reaction. Because the water and lubricant tend to migrate toward the exterior of the pellet at elevated temperatures, localized sintering takes place to a larger extent in the exterior portion of the agglomerate. Thus, the product pellet is a porous, two-layer structure of the kind described—a structure which largely overcomes the above-mentioned deficiencies of porous pellets fabricated for sorption applications by previous methods.

It will be apparent that in the above-mentioned fluorination operations, a very rapid increase in applied temperature or in fluorine concentration would produce sufficient heat to effect generalized sintering. For this reason, changes in these parameters are made gradually, meaning at rates consistent with the overall objective of effecting localized, rather than generalized, sintering.

The following is a more specific example of one form of our invention as directed to the production of porous pellets of cryolite.

EXAMPLE I

Ten pounds of cryolite powder (mesh size, 100 to 300) is blended with 0.1 pound stearic acid lubricant and sufficient water (about 10 wt. percent) to provide a slightly moist mixture. The mixture is extruded in any suitable extruder, such as a commercial screw-driven extruder having a die with 3/16"-diameter holes, through which the mixture is forced at a rate of 15"/min. The extruded material is separated into agglomerates and exposed to atmospheric air for a period of 12 hours, and then charged into a muffle furnace at room temperature. A gas mixture of fluorine and argon (fluorine concentration 10 vol. percent) is passed through the muffle at a rate of 4 s.c.f.h. while the muffle temperature is gradually increased to 400° F. over a period of one hour. After reaching a muffle temperature of 400° F., the fluorine concentration is gradually increased to about 100 vol. percent over a period of one hour, the gas flow being maintained at 4 s.c.h.f. The furnace temperature is monitored, and if necessary the fluorine concentration is decreased temporarily to prevent excursions above 425° F. (Note: The generalized-sintering temperature for these agglomerates in the same atmosphere is about 950° F.) The conditions of 100% fluorine and 400° F. are maintained for two hours, after which the muffle is cooled to room temperature while purging with argon.

The resulting pellets are about 3/16" in diameter by ½ to 1" in length and have a generally smooth, silver-gray surface. They have two-layer structure—i.e., a relatively hard, tough crust and a significantly softer interior. The pellets have a nitrogen-gas-sorption surface area of 1.68 m.²/g. and a void fraction of 0.354 (as measured by mercury intrusion). In contrast, pellets with a surface area of 0.448 m.²/g. and a void fraction of 0.276 are obtained when the same cryolite powder is formed into porous pellets in accordance with a conventional process comprising these operations: air drying; heating in argon to 950° F. over a period of four hours; sintering in flowing argon at 950° F. for four hours; cooling; contacting with concentrated $F_2$ (80 vol. percent or more) for two hours at 250° F.

Niobium pentafluoride loading tests conducted with the cryolite pellets produced in accordance with our invention show that the pellets load significantly more pentafluoride and, of equal importance, load the pentafluoride at a faster rate than conventionally produced pellets, all other conditions being equal. In these tests, single layers of pellets were placed in a one-inch-diameter trap, heated to 220° F. and pressured to 10.1 p.s.i.a. They were then exposed to 1600 std. cc./min.-sq. cm. nitrogen containing 600 p.p.m. NbF$_5$. At different time intervals the flows were interrupted and the NbF$_5$ loading determined. The results are summarized in the table, below, where column A refers to pellets produced in accordance with this invention and column B refers to generally sintered pellets produced by a conventional technique.

TABLE

NbF$_5$ sorption tests

| | Pellet A | Pellet B |
|---|---|---|
| Surface area, m.$^2$/g | 0.459 | 0.416 |
| Void fraction | 0.534 | 0.446 |
| NbF$_5$ loading period (hours): | | |
| 1, percent | 3.63 | 2.25 |
| 5, percent | 9.44 | 6.36 |
| 10, percent | 14.06 | 8.49 |
| 15, percent | 16.41 | 9.61 |
| 20, percent | 18.03 | 11.91 |
| 30, percent | 19.61 | 12.07 |

Referring to the test summarized in the table, the generally sintered pellets tended to powder during handling, whereas the pellets produced in accordance with this invention showed no sings of degradation.

EXAMPLE II

Porous pellets having the desired properties can be produced from powdered sodium fluosilicate using a procedure identical to that described in Example I. The resulting pellets—which in this example measured about 1" long and 3/16" in diameter—have a two-layer structure and are sufficiently hard to permit handling and to withstand repeated sorption-desorption cycles. The pellets as produced in this example have a nitrogen-sorption surface area of 0.384 m.$^2$/g. and an initial void fraction of 0.326.

It will be apparent that the principles of our invention apply to the production of two-layer porous pellets from other sinterable metal fluoride powders which, like cryolite and sodium fluosilicate, are essentially non-reactive in fluorinating atmospheres. Localized sintering of water-containing agglomerates consisting mainly of these materials can be effected by controlled fluorination as described, thus providing product pellets having the desired structure and properties described above.

What is claimed is:

1. The method of making a stable and porous body from a sinterable powder selected from the group consisting of alkali metal fluorides, alkaline earth metal fluorides, AlF$_3$, CuF$_2$, NiF$_2$, BiF$_3$, and the complex fluorides Na$_3$AlF$_6$, MgSiF$_6$, Na$_2$ZrF$_6$, and K$_2$ZrF$_6$, said method comprising:

(a) forming, from said powder and water, an agglomerate containing from about 0.5 to 25 wt. percent water dispersed therein;
    (b) contacting the agglomerate with a mixture of a gaseous fluorinating agent and a non-reactive gas to convert essentially all of the water dispersed therein to volatile products by localized exothermic reaction of said agent and water; and
    (c) controlling the temperature of contacting and the concentration of said agent to limit the heat generated by said reaction to values effecting bonding of said agglomerate by localized sintering at the sites occupied by said water.

2. The method of claim 1 wherein the agglomerate to be contacted contains from about 2 to 10 wt. percent water.

3. The method of claim 1 wherein a volatilizable organic lubricant is incorporated in the agglomerate to be contacted, substantially all of said lubricant being converted to volatile products by reaction with said gaseous fluorinating agent.

4. The method of claim 1 wherein said agglomerate is contacted with said gaseous fluorinating agent in two successive operations, the first of which is conducted at a lower temperature and with a lower concentration of said agent than is the second.

5. The method of claim 4 wherein said gaseous fluorinating agent is fluorine.

6. The method of claim 1 wherein said agglomerate is contacted, at an initial temperature in the range of about 80 to 100° F., with a flowing gaseous mixture of fluorine and a non-reactive carrier, said mixture comprising from about 5 to 10 vol. percent fluorine, said initial temperature gradually being increased to a selected value below 950° F.

7. The method of claim 6 wherein the agglomerate so contacted is maintained at essentially said selected temperature value and the concentration of fluorine in said mixture is gradually increased to a higher value in the range of 80 to 100 vol. percent, the fluorine concentration being maintained at said higher value until fluorine consumption essentially ceases.

References Cited

UNITED STATES PATENTS

| | | | |
|---|---|---|---|
| 3,341,281 | 9/1967 | Davis et al. | 252—441 |
| 3,372,004 | 3/1968 | Richardson et al. | 264—117 |
| 3,431,067 | 3/1969 | Kato et al. | 252—441 |
| 3,457,188 | 7/1969 | Derosset | 252—441 |
| 3,472,789 | 10/1969 | Cottrell | 252—441 |
| 3,514,253 | 5/1970 | Robota | 423—465 |
| 3,625,646 | 12/1971 | Bachelard | 423—465 |

JOHN H. MILLER, Primary Examiner

U.S. Cl. X.R.

23—313; 252—441, 442; 264—82; 423—489, 490